United States Patent [19]
Maehara et al.

[11] Patent Number: 5,754,030
[45] Date of Patent: May 19, 1998

[54] DUTY RATIO CONTROL FOR A VEHICULAR GENERATOR RESPONSIVE TO LOW AND HIGH POWER LOADS

[75] Inventors: Fuyuki Maehara, Kariya; Tadatoshi Asada, Anjo; Yasuhiro Takase, Kariya; Wakako Kanazawa, Toyokawa, all of Japan

[73] Assignee: Nippondenso Co., Ltd., Kariya, Japan

[21] Appl. No.: 670,314

[22] Filed: Jul. 16, 1996

[30] Foreign Application Priority Data

Jul. 17, 1995 [JP] Japan ................... 7-180375

[51] Int. Cl.$^6$ ............................... H02P 9/00
[52] U.S. Cl. ................. 322/19; 322/20; 322/21; 322/34
[58] Field of Search ................. 322/19, 25, 28, 322/27

[56] References Cited

U.S. PATENT DOCUMENTS

| | | | |
|---|---|---|---|
| 4,682,044 | 7/1987 | Hotate et al. | 290/40 B |
| 5,352,971 | 10/1994 | Nishimura | 322/27 |
| 5,387,820 | 2/1995 | Imagawa | 307/31 |
| 5,483,146 | 1/1996 | Schultz et al. | 322/7 |
| 5,561,363 | 10/1996 | Mashino et al. | 322/25 |
| 5,581,172 | 12/1996 | Iwatani et al. | 322/28 |
| 5,606,246 | 2/1997 | Adachi | 322/8 |

FOREIGN PATENT DOCUMENTS

| | | |
|---|---|---|
| 3-117400 | 5/1991 | Japan . |
| 3-190535 | 8/1991 | Japan . |
| 6-225473 | 8/1994 | Japan . |

*Primary Examiner*—Steven L. Stephan
*Assistant Examiner*—Nicholas Ponomarenko
*Attorney, Agent, or Firm*—Cushman, Darby & Cushman IP Group of Pillsbury, Madison & Sutro LLP

[57] ABSTRACT

Duty ratio of a power switching transistor connected to the field coil is controlled according to whether or not a high-power load is connected. When the high power load is not connected, the duty ratio is made 60%, for example, so that excessive power not generated. On the other hand, when the high power load is connected, the duty ratio is increased to 100% so that full power is generated by the generator. The power switching transistor is also controlled according to the battery voltage in a well known manner.

17 Claims, 7 Drawing Sheets

DUTY RATIO CONTROL FOR A VEHICULAR GENERATOR RESPONSIVE TO LOW AND HIGH POWER LOADS

CROSS REFERENCE TO RELATED APPLICATION

The present application is based on and claims priority from Japanese Patent Application No. Hei 7-180375, filed on Jul. 17, the contents of which are incorporated herein by reference.

BACKGROUND OF THE INVENTION 1. Field of the Invention

The present invention relates to a generating apparatus for a vehicle, and particularly to a generating apparatus for a vehicle which has high power electric loads. 2. Description of the Related Art In general, the rated voltage of the vehicle battery and the vehicle electric load is 12 V. However, an electric load having a higher rated voltage (hereinafter referred simply to as the high-voltage load) has been used recently. In order to energize the high electric load, a generation voltage changeover system has been adopted. The changeover system disconnects an and/or electric loads before changing from a generating mode into a high-voltage-generating-mode.

For example, JP-A-3-190535 proposes an apparatus in which usually, the output power is regulated to be lower than a preset level and when a large electric load is connected, a high voltage is applied to the field coil of a generator to increase an output power of the generator. This apparatus is effective to lighten the engine load.

However, because the output power of the above system is controlled when the battery voltage is excessively lowered, the output power would not respond immediately when the above mentioned high power load is connected, resulting in the fluctuation of the battery voltage and over-discharge of the battery.

JP-A 3-117400 proposes a system in which the output power is controlled within a level which is generated at a high temperature operation of the generator, and is increased to a full power, level when high power such as a for heater, is necessary.

However, such a small difference of the output power level between the usual temperature and high temperature is not sufficient for the generator to prevent the voltage fluctuation is when the high power load is connected or disconnected.

SUMMARY OF THE INVENTION

The present invention is made in view of the above problems.

Therefore, a main object of the present invention is to provide an improved generating apparatus for a vehicle which reduces the engine load sufficiently when a high power load is not connected and increases the output power sufficiently when the high power load is connected.

Another object of the present invention is to provide a generating apparatus for a vehicle which comprises a generator which can supply power to both a regular vehicle load and a high power load at the same time. The apparatus includes a first means for detecting the connection of the high power load with the generator. A second means controls the generator according to detecting result of the first means.

The second means controls output power of the generator within a power generated at a temperature higher than a preset level when the high power load is not connected to the generator and allows the generator to generate unlimited output power when the high power load is connected to the generator.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Preferred embodiments of the present invention are described with reference to the appended drawings.

Figure 1:
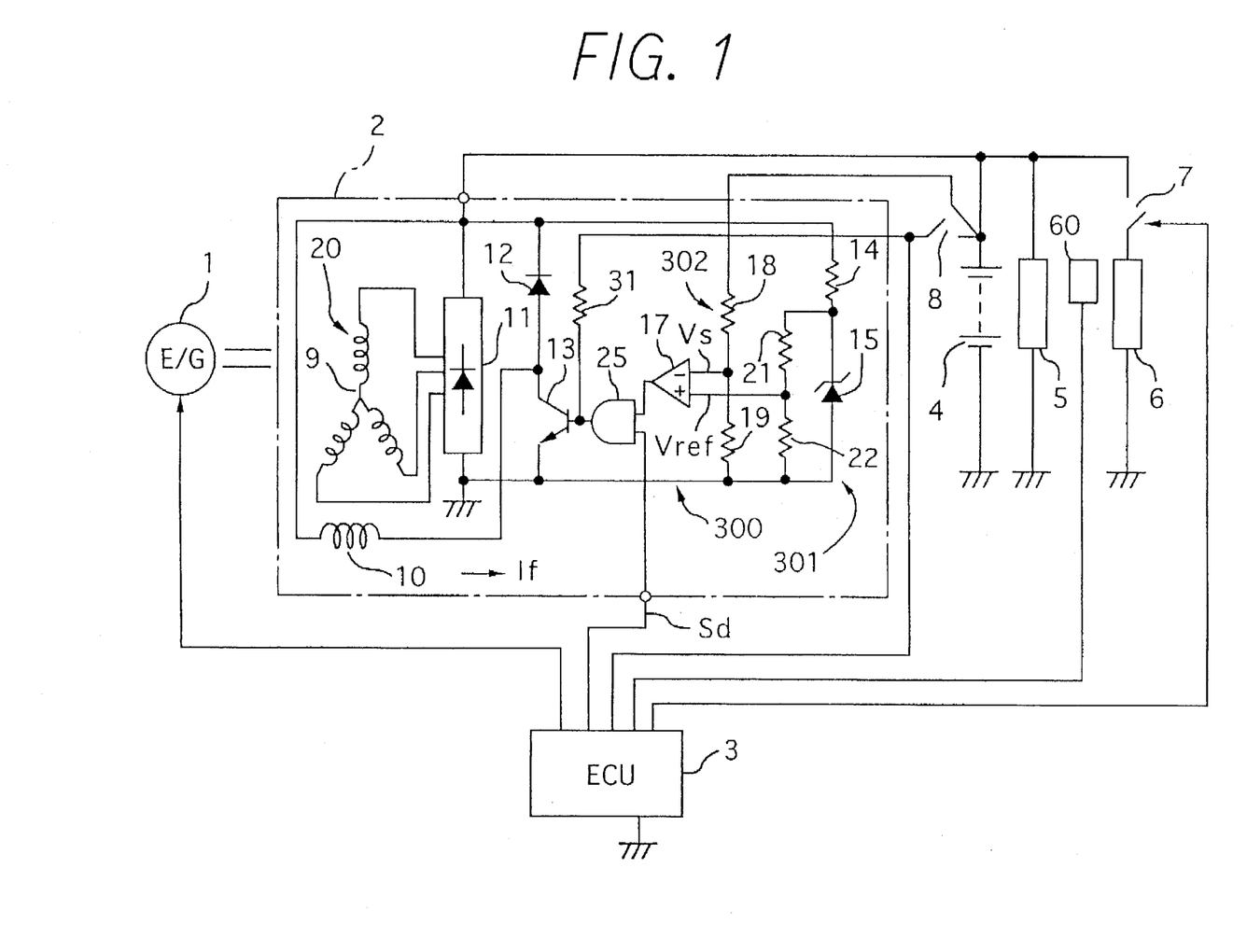
FIG. 1 is a circuit diagram of a vehicle electric supply system including a generating apparatus according to a first embodiment of the present invention.

A generating apparatus for a vehicle having an engine 1 according to a first embodiment is described with reference to FIG. 1.

The generating apparatus has a generating unit 2, an engine control unit 3. The generating unit 2 includes of a three-phase AC generator 20 which has armature coils 9 and a field coil 10. The generating unit 2 also includes a three-phase full-wave rectifier 11 which rectifies three-phase AC voltage generated in the armature coils 9 and supplies DC current to a battery 4, and a regulator 300 which controls field current supplied to the field coil 10. An electric load 5 and a heater (EHC) 6 for a catalytic converter, through a power switch 7, are connected across the battery 4.

The regulator 300 includes a reference voltage generating circuit 301 which has resistors 14, 21 and 22 and a constant voltage diode 15, a voltage dividing circuit 302 which has resistors 18 and 19, a comparator 17. The regulator 300 also includes an AND circuit 25, a field-coil-control switching transistor 13, a flywheel diode 12, and a load resistor 31 which supplies the base of the transistor 13 with the base current from the battery 4 through a key switch 8. The output stage of AND circuit 25 has an emitter-grounded transistor with open-collector-connection having a load resistor 31 to prevent the transistor from turning on when the key switch 8 is turned off.

The comparator 17 compares a reference voltage Vref generated by the reference voltage generating circuit 301 and a divided battery-voltage Vs. Battery voltage Vs is divided by the voltage dividing circuit 302, and generates a low level signal Lo when Vs is higher than Vref and a high level signal Hi when Vs is lower than Vref. The AND circuit 25 transmits an output signal of the comparator 17 to the transistor 13 when a duty ratio control signal Sd is applied by the ECU 3 so that the transistor 13 on-off switching controls the field current If according to the output signal of the comparator 17. Thus, the battery voltage is regulated to a suitable level.

Figure 2:
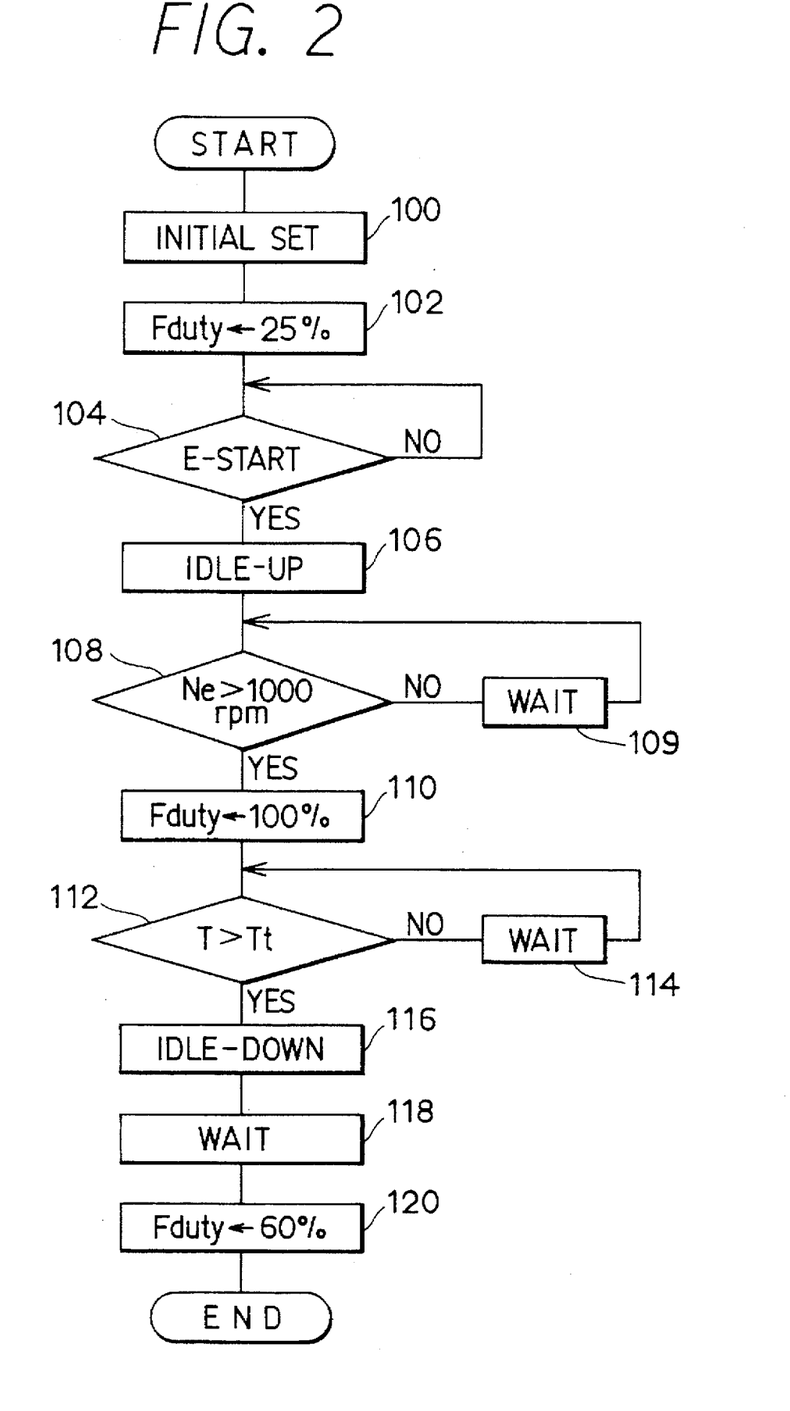
FIG. 2 is a flow chart of operational process of a ECU of the first embodiment.

The duty ratio control of the ECU 3 is described with reference to a flow chart shown in FIG. 2.

When the key switch 8 is turned on, the ECU 3, which is powered by the battery through the key switch 8, starts a routine. After an initial set is carried out in the first step 100, the ECU supplies a PWM signal of an on-duty ratio Fduty 25% of a duty ratio control signal Sd to the AND circuit 25 in step 102. The battery voltage at this moment is low because it powers a starter (not shown), and therefore, the output signal of the comparator 17 becomes high. Consequently, the transistor 13 is controlled solely by the duty ratio control signal Sd and the duty ratio of the field current is fixed to 25%.

Thereafter, when the engine speed becomes a prescribed level and is detected by a sensor (not shown), the engine start is confirmed in step 104 where the power switch 7 is closed to supply the heater 6 with electric current. Thereafter, the idle speed is increased in a well-known manner in step 106.

Thereafter, the ECU 3 waits until the engine speed Ne becomes a set value, e.g. 1000 rpm, which is higher than the idle speed in steps 108 and 109. When the engine speed Ne becomes higher than the set value (1000 rpm), the on-duty-ratio Fduty is set to 100% to turn on the transistor 13 continuously in step 110. That is, when the engine speed is higher than the set value (1000 rpm), the engine does not stall even if high power is generated by the AC generator. Because power consumption by the heater 6 is so large, the battery voltage lowers and causes the comparator 17 to provide the high level signal continuously. Therefore, the transistor 13 becomes fully conductive at the on-duty ratio Fduty 100%.

Thereafter, the CPU waits until a temperature sensor 60, which detects temperature T of the heater 6, detects the temperature higher than a predetermined temperature Tt in steps 112 and 114. If the temperature T is higher than Tt, the power supply to the heater is not necessary, and therefore, the electric supply is cut and the idle speed is reduced to the original speed in step 116. The CPU 3, thereafter, waits for a period ΔT in step 118 and set the on-duty ratio Fduty to 60% in step 120. When the power supply to the heater 6 is cut, the on-duty ratio Fduty of the transistor 13 is set to less than 60% whether or not all other loads are connected, and therefore, the engine is prevented from stalling. The on-duty ratio Fduty 60% limits the generator power to lower the generator temperature to a level lower than 80 °C.

Figure 4A:
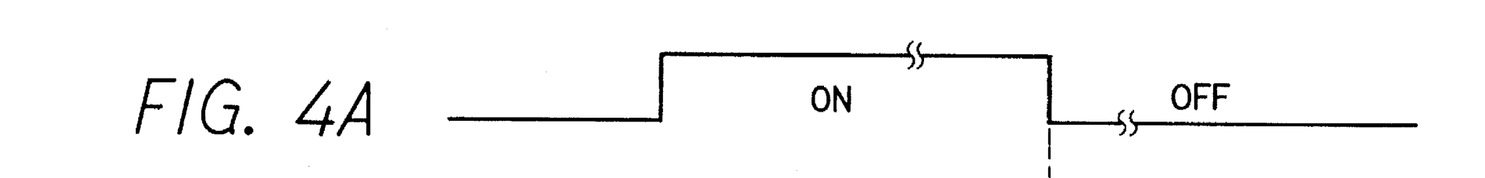
FIGS. 4A, 4B, 4C and 4D are timing charts showing relationship between time and the duty ratio.
Figure 4B:
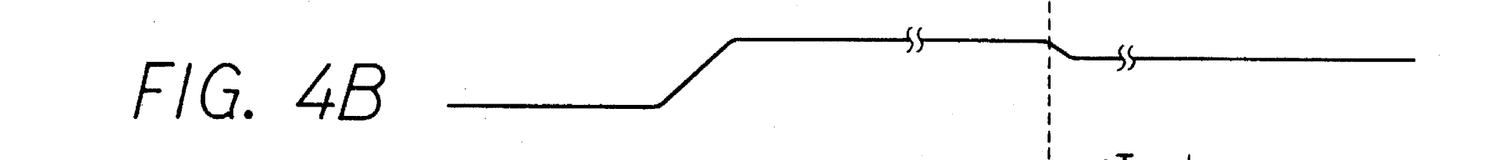
Figure 4C:
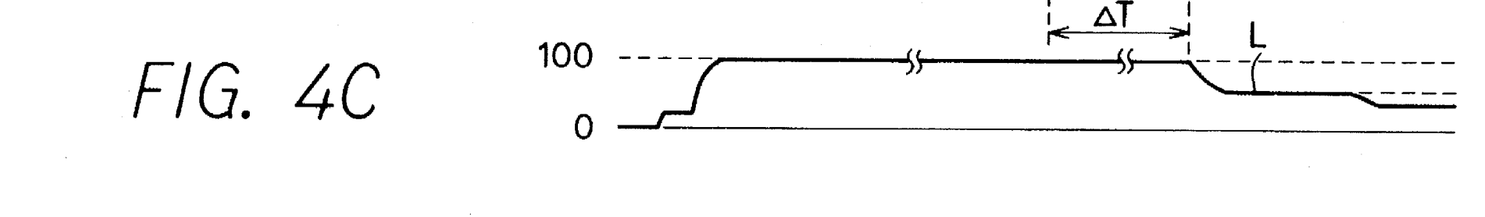

FIG. 4C shows change in the on-duty ratio Fduty, where L indicates a range of Fduty less than 60%. The period ΔT can be decreased to 0.
(Second Embodiment)

Figure 3:
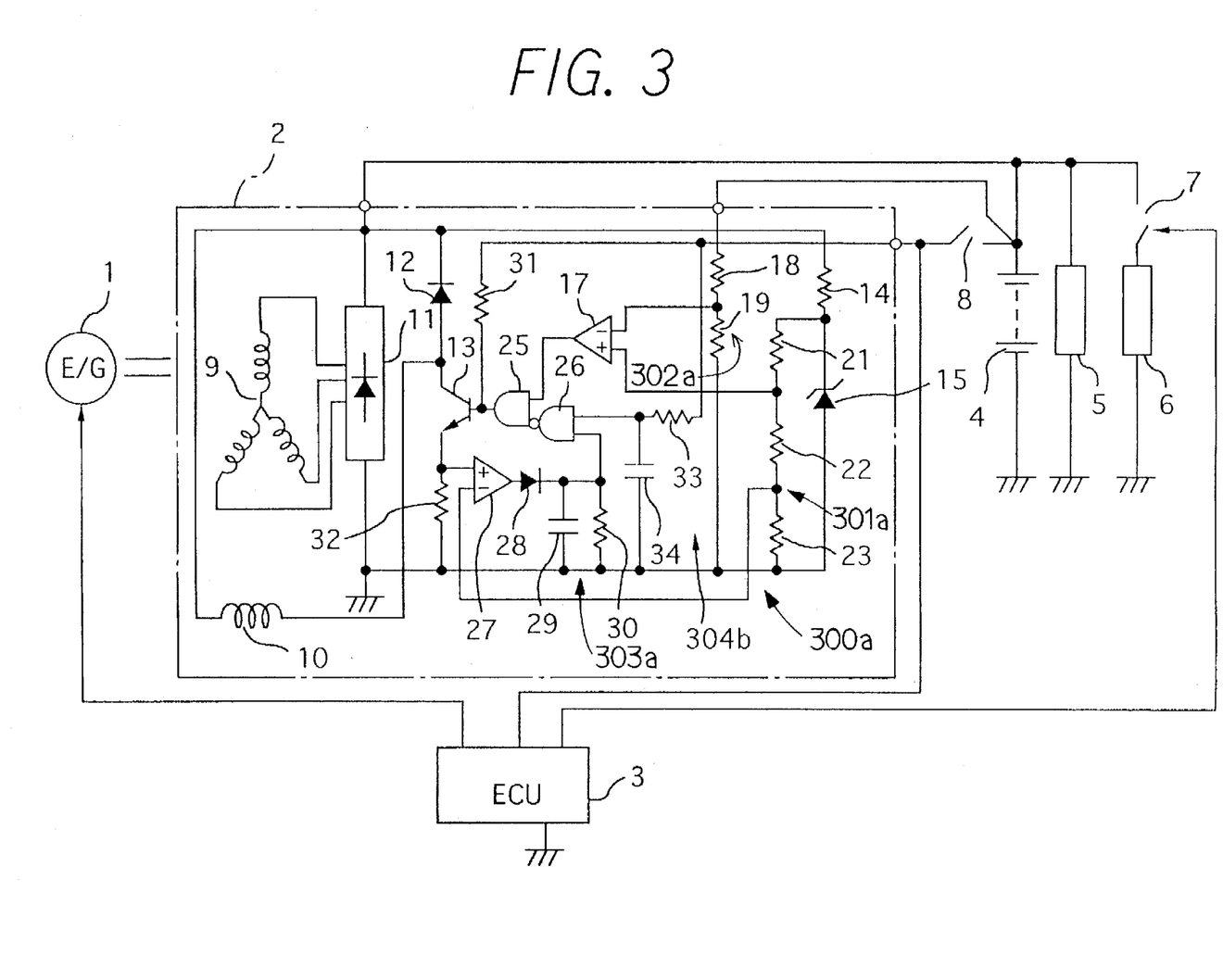
FIG. 3 is a circuit diagram of a vehicle electric supply system including a generating apparatus according to a second embodiment of the present invention.

A generating apparatus for a vehicle according to a second embodiment is described with reference to FIG. 3. The same reference numerals indicate the same or substantially the same portions or parts, and therefore, a detailed description thereof is omitted.

In the apparatus, a regulator 300a has a NAND circuit 26 connected to an input terminal of the AND circuit 25 which is same as the first embodiment. When the NAND circuit 26 generates a high level signal, the transistor 13 is controlled by the comparator 17 through the AND circuit 25. The comparator 17 is substantially the same as the first embodiment. A reference voltage generating circuit 301a has a resistor 23 connected in series with the resistors 21 and 22 (same as the first embodiment) to provide a reference voltage Vref2. The voltage dividing circuit has the resistors 18 and 19 to provide the divided battery-voltage Vs.

A circuit for the duty ratio control is described hereafter.

The circuit includes the NAND circuit 26 which provides the AND circuit 25 with an output signal, an emitter resistor 32 which is connected between the emitter of the transistor 13 and a ground to detect electric current. A comparator 27 compares the emitter voltage of the transistor 13 and the reference voltage Vref2. A delay circuit 303a supplies a delayed output signal of the comparator 27 with an input terminal of the NAND circuit 26 when the signal voltage starts to fall. A delay circuit 304b has a resistor 33 and a capacitor 34 to supply a delayed signal with another input terminal of the NAND circuit 26. The delay circuit 303a includes a capacitor 29 which has a grounded lower side terminal and a higher side terminal connected to the comparator 27 through a diode 28 (which checks back flow from the capacitor 29 to the output-terminal of the comparator 27). The delay circuit 303a also includes a resistor 30 connected in parallel with the capacitor 29.

When current through the transistor 13 increases and the emitter voltage becomes higher than the reference voltage Vref2, the comparator 27 provides a high level signal to charge the capacitor 29, thereby causing the NAND circuit 26 to provide a low level signal, and turn off the transistor 13. Consequently, the field current If is supplied through the flywheel diode 12 and gradually decreases.

On the other hand, when the transistor 13 is turned off, the comparator 27 provides a low level signal. However, since the delay circuit 303a does not provide a low level signal instantly, the transistor 13 is not turned on again until a certain period passes. When the transistor 13 is turned on, the field current increases gradually, and the transistor 13 repeated 14 turns on and off as far as the emitter voltage of the transistor 13 (which is proportional to the field current) does not increase beyond a predetermined amount.

Although the field current If is momentarily regulated to stay within a certain level, the battery voltage may gradually increase and the divided battery voltage Vs exceeds the reference voltage Vref. In such a case, the comparator 17 provides a low level signal to turn off the transistor 13. That is, the regulator 300a regulates the field current If within a suitable level and maintains the divided battery voltage Vs to the reference voltage Vref.

Figure 4D:
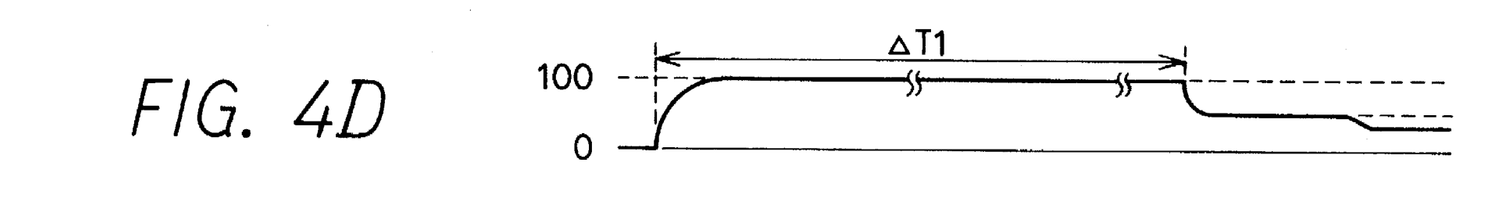

The delay circuit 304b provides a low-level signal with the NAND circuit 26 ΔT1 after the key switch 8 is turned on so that the NAND circuit 26 provides a high level signal during the period ΔT1 as shown in FIG. 4D.

When the period ΔT1 passes, the delay circuit 304b provides a high level signal so that the regulator 300a regulates the battery voltage as described before (the divided voltage Vs is regulated to the reference voltage Vref).

FIG. 4D shows change in the on-duty ratio Fduty of the transistor 13. The delay circuit 304b of the regulator 300a detects a time period after the heater 6 of the catalytic converter is disconnected.

Figure 5:
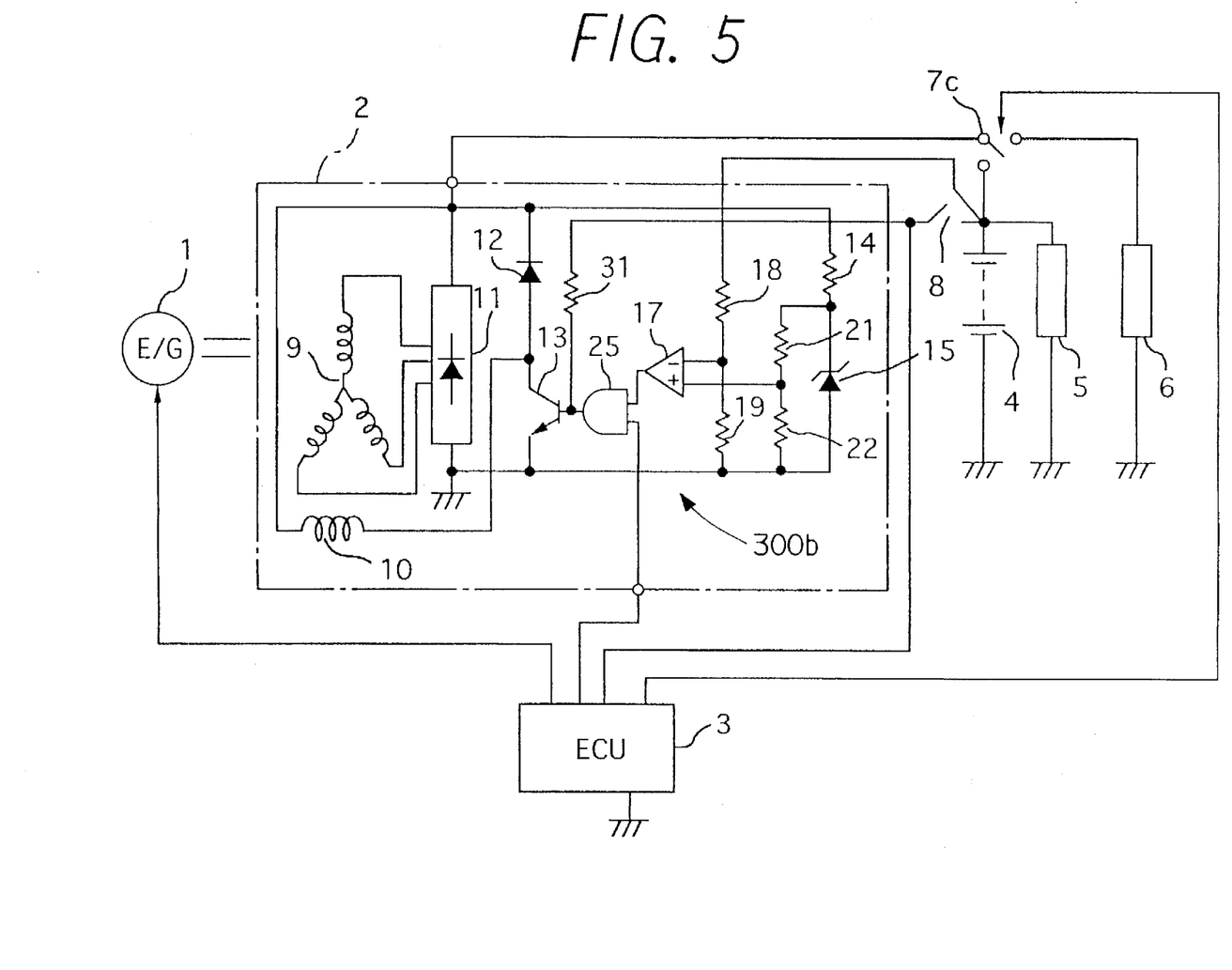
FIG. 5 is a circuit diagram of a vehicle electric supply system including a generating apparatus according to a third embodiment of the present invention.

A generating apparatus according to a third embodiment of the present invention is described with reference to FIG. 5.

The apparatus according to the third embodiment is substantially the same as that of the first embodiment except for the switch 7, which is replaced by a switch 7c. The switch 7c switches over a high-DC-output terminal of the three-phase full-wave rectifier 11 from one of higher level terminals of the battery 4 and the heater 6 to the other. The switch 7c is switched to the heater 6 side in step 106 in FIG. 2, and switched to the battery 4 side in step 116.

Therefore, current may not flow from the battery 4 to the heater 6. Since the vehicle electric load 5 is small as compared with the battery capacity, fluctuation of the battery voltage when the heater is connected can be prevented.

Figure 6:
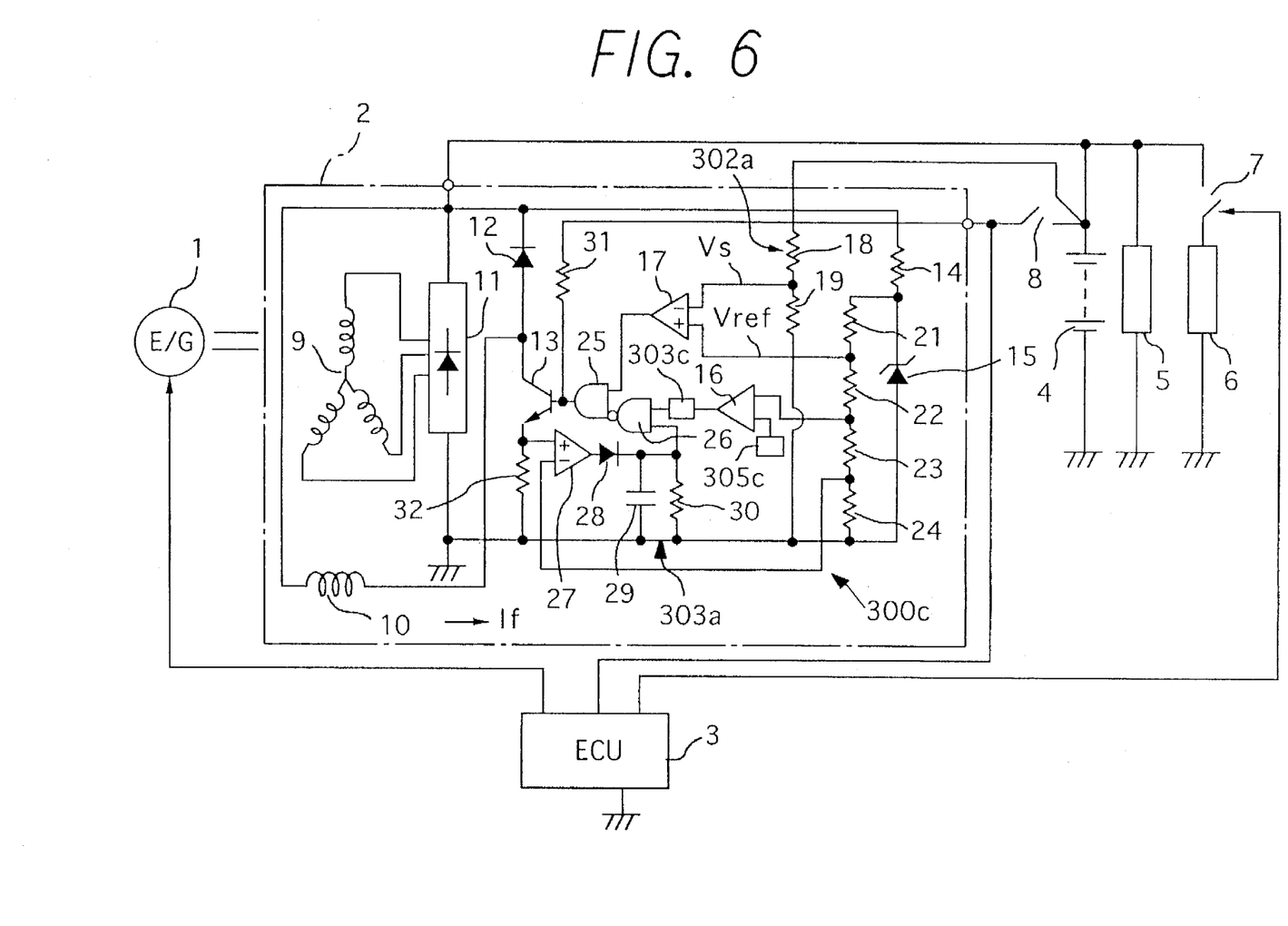
FIG. 6 is a circuit diagram of a vehicle electric supply system including a generating apparatus according to a fourth embodiment of the present invention.
Figure 7:
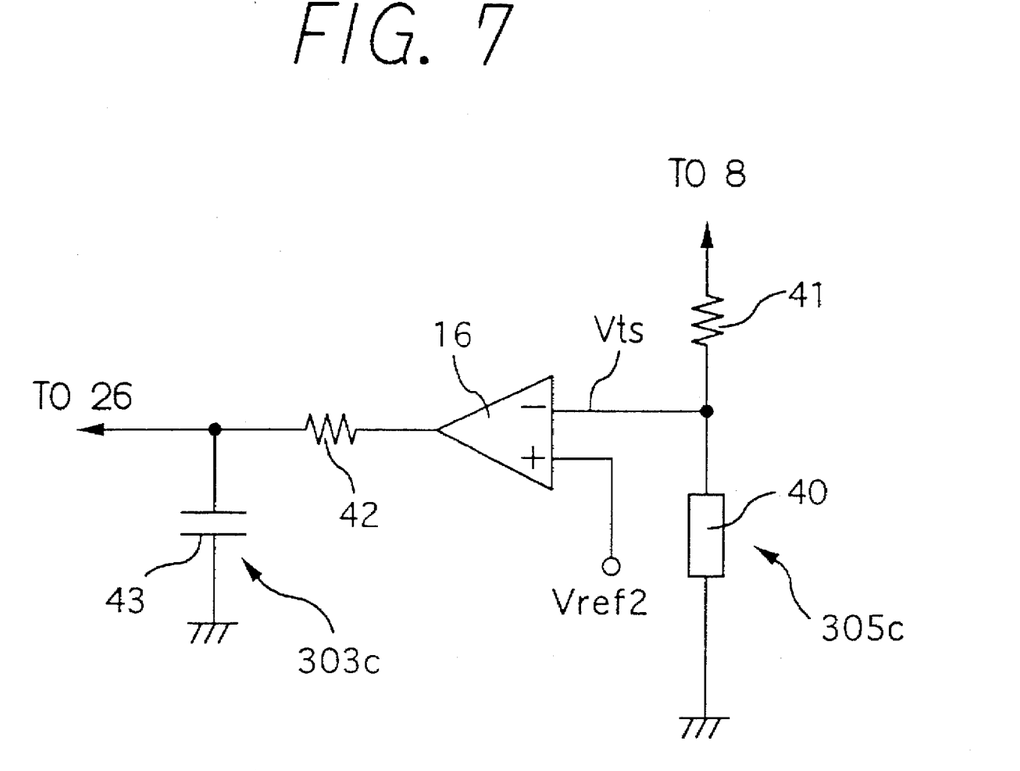
FIG. 7 is a circuit diagram showing a main part of the fourth embodiment.

A generating apparatus according to a fourth embodiment is described with reference to FIGS. 6 and 7.

The apparatus according to the fourth embodiment is only different from the second embodiment in that the delay circuit 304b is replaced by a different circuit composed of a temperature detecting circuit 305c, a comparator 16 and a delay circuit 303c. A resistor 24 is also inserted into the voltage dividing circuit composed of the resistors 21, 22 and 23. The temperature detecting circuit 305c has a series circuit of a thermistor 40 and a resistor 41 as shown in FIG. 7. The delay circuit 303c supplies the NAND circuit 26 with the output signal of the comparator 16 after a prescribed time period passes. The comparator 16 is supplied with a divided voltage as a reference voltage which is obtained by inserting the resistor 24 into the voltage dividing circuit. The delay circuit 303c is a low pass filter composed of a resistor 42 and a capacitor 43. The thermistor 40 is disposed near the transistor 13.

The operation of the apparatus with regard to the different portion is described below. When the heater is connected, the transistor 13 is made conductive at 100% on-duty ratio and the temperature of the thermistor 40 increases gradually to lower the resistance thereof. Consequently, the temperature signal voltage Vts lowers and becomes lower than the reference voltage Vref2. Then, the comparator 16 provides a high level signal, which is applied through the resistor 42 to the capacitor 43. The capacitor 43 applies a high level signal to the NAND circuit 26 after a prescribed time period. Other operation is the same as the operation of the second embodiment. A temperature detecting element other than a thermistor can be used. The delay circuit 303c can also be omitted.

Since the operation of the heater 6 can be detected by detecting the operation of the key switch, additional lead wire for detecting the heater operation can be omitted.

As a variation, the heater can be turned on when or immediately after the engine starts, then turned off for a certain period, and the on-duty ratio of the transistor 13 started thereafter. In this variation, the operation of the heater 6 is detected by the regulator in a period from when the engine starts until a certain period passes.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A generating apparatus for a vehicle equipped with a key switch and a regular vehicle load including a battery and a high power load to be connected for a short time, said apparatus comprising:

a generator having a field coil and an armature coil;

a voltage regulator, having a switching transistor connected to said field coil and a voltage detecting circuit connected across said battery, for regulating output voltage of said generator to a suitable voltage level;

first means connected to said voltage detecting circuit for detecting a connection of said high power load with said generator;

second means for disconnecting said high power load from said generator within said short time; and third means connected to said switching transistor for controlling a duty ratio of said transistor so that said generator generates limited power when said high power load is not connected to said generator and unlimited power when said high power load is connected to said generator.

2. A generating apparatus as claimed in claim 1, wherein said third means comprises PWM signal generating means.

3. A generating apparatus as claimed in claim 2, wherein said duty ratio is 60% when said high power load is not connected to said generator.

4. A generating apparatus as claimed in claim 2, wherein said PWM signal generating means includes an ECU.

5. A generating apparatus as claimed in claim 1, wherein said first means comprises means for turning off said switching transistor when said duty ratio becomes higher than a predetermined level for a prescribed time.

6. A generating apparatus as claimed in claim 5, wherein said means for turning off comprises a delay circuit connected between said key switch and said switching transistor.

7. A generating apparatus as claimed in claim 1, wherein said first means comprises a delay circuit connected between said voltage detecting circuit and said switching transistor.

8. A generating apparatus as claimed in claim 7, wherein said delay circuit comprises a thermistor disposed near said switching transistor and a comparator connected to said thermistor for detecting temperature of said switching transistor.

9. A generating apparatus for a vehicle equipped with a regular vehicle load including a battery and a high power load to be connected for a short time, said apparatus comprising:

a generator having a field coil for generating output power to be supplied to both said regular vehicle load and said high power load for at least said short time;

first means for detecting connection of said high power load with said generator;

second means for disconnecting said high power load from said generator within said short time; and third means for limiting said output power of said generator to less than a maximum amount to be generated when said high power load temperature is higher than a preset level and when said high power load is not connected to said generator.

10. A generating apparatus as claimed in claim 1, wherein said second means comprises a power switch connected between said generator and said high power load and a temperature sensor for detecting temperature of said high power load.

11. A generating apparatus as claimed in claim 9, wherein said third means includes a voltage detecting circuit and a voltage regulating circuit having a switching element connected to said field coil.

12. A generating apparatus as claimed in claim 10, wherein said third means comprises duty ratio control means for controlling a switching element at a high preset duty ratio when said high power load is connected and a low preset duty ratio when said high power load is not connected.

13. A generating apparatus as claimed in claim 12, wherein said high preset duty ratio is 100% and said low preset duty ratio is 60%.

14. A generating apparatus as claimed in claim 10, wherein said first means comprises said power switch connected to said high power load and an ECU for controlling said power switch.

15. A generating apparatus as claimed in claim 12, further comprising:

means for detecting engine speed, wherein said third means is permitted to control said switching element at said high preset duty ratio only when said engine speed becomes higher than a preset speed.

16. A generating apparatus as claimed in claim 10, wherein said first means comprises a key switch for said vehicle and a delay circuit connected between said key switch and a switching element of said third means.

17. A generating apparatus as claimed in claim 9, wherein said first means comprises a voltage dividing circuit connected across said battery and a delay circuit connected between said voltage dividing circuit and a switching element, said delay circuit comprising a thermistor disposed near said switching element and a comparator connected to said thermistor for detecting temperature of said switching element.

* * * * *